April 24, 1928.  1,667,479
H. KOESTER
CHART DRIVE ROLL FOR STRIP RECORDING APPARATUS
Filed Dec. 2, 1926
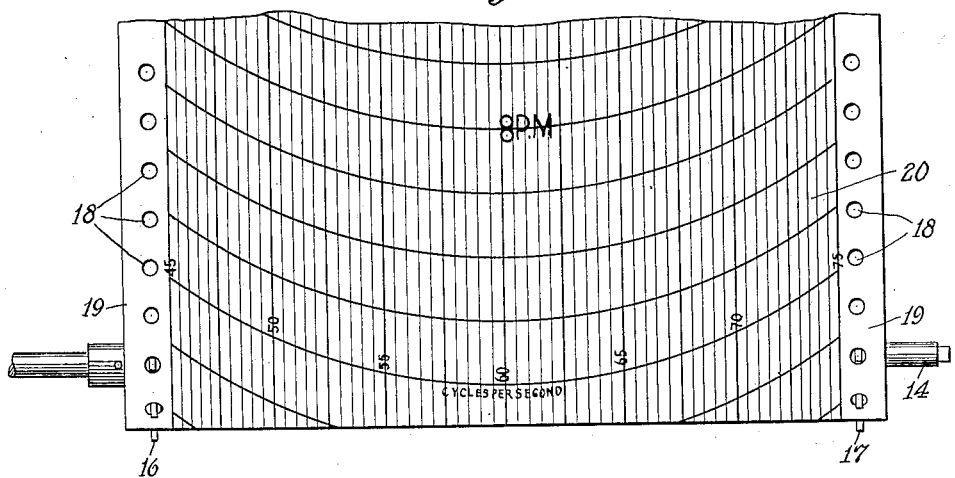
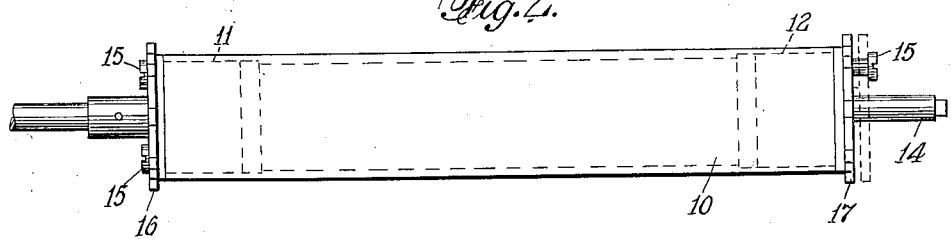
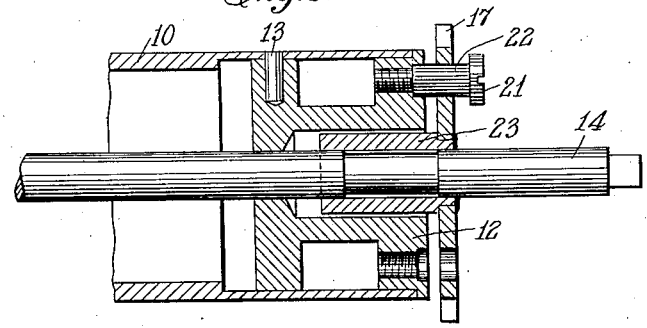
INVENTOR
Herman Koester
BY
ATTORNEY Patented Apr. 24, 1928.

1,667,479

UNITED STATES PATENT OFFICE.

HERMAN KOESTER, OF WATERBURY, CONNECTICUT, ASSIGNOR TO THE BRISTOL COMPANY, OF WATERBURY, CONNECTICUT, A CORPORATION OF CONNECTICUT.

CHART DRIVE ROLL FOR STRIP-RECORDING APPARATUS.

Application filed December 2, 1926. Serial No. 152,135.

The invention relates to recording apparatus employing a record chart in the nature of a continuous strip of material, and more particularly to the driving roll for advancing such strip to the means for effecting a record thereon. The record strips utilized for this purpose are generally of paper, which, it will be understood, is more or less susceptible to changes in climatic conditions, more particularly conditions of temperature and moisture. That is to say, in charts especially of considerable width, there is an appreciable variation of such width under different conditions of temperature and humidity of the surrounding atmosphere to which the strip is subjected in use. It has been the practice heretofore to drive record strips of this character by means of sprocket-wheels at the ends of a drive roll, the said sprocket-wheels being rigidly connected to the roll and of a fixed and predetermined distance apart which conforms to the distance between two rows of perforations of the chart in which the said teeth are to engage for advancing said chart. It will be appreciated that where the humidity and temperature ranges are considerable, the variation in distance between the two rows of perforations of a chart may be sufficient to cause the latter to buckle and thus interfere with the production of an accurate record as well as with the operation of the recording instrumentalities; also, the buckling may be sufficient even to cause the record strip to jump the sprocket teeth and thus entirely disorganize the recording operation.

The present invention has for its object the provision of means whereby this variation in normal width of the record strip may be automatically accommodated so that the recording apparatus will at all times function properly and an accurate record be obtained of the conditions which it is desired to record.

The nature of the invention, however, will best be understood when described in connection with the accompanying drawings, in which:

Fig. 1 is a plan of a portion of the record strip as engaged by the sprocket-wheels of the driving roll.

Fig. 2 is a plan of the driving roll for the record strip and the movable sprocket, the latter being also shown in dotted lines to indicate its limit position.

Fig. 3 is an enlarged fragmentary longitudinal section of the movable sprocket end portion of the drive roll.

Referring to the drawings, 10 designates a drive roll comprising a hollow cylindrical portion which is secured over two hollow end hub portions 11 and 12 as in having a drive fit thereover and being pinned thereto by the pins 13. Through the said cylinder 10 passes a spindle 14 to which the roll 10 is secured through its hubs in any suitable manner, and the roll in turn is to be driven through said spindle in any convenient manner and as is well understood in the art.

At one end of said roll is secured, as by means of the shouldered screws 15, a driving sprocket 16, a similar sprocket 17 being mounted at the opposite end of the roll for rotation therewith; and the said sprockets are adapted through their teeth to engage the perforations 18 along the respective marginal portions 19 of the record strip 20 in the usual manner for advancing said record strip.

While the sprocket 17 is designed to rotate with the cylinder 10 it is nevertheless so mounted with reference thereto that it may have an axial movement relative thereto. For example, a shouldered screw 21 of greater length than the screws 15 and having an intermediate unthreaded portion 22 is utilized to secure the sprocket 17 to the one end of the roll 10, or rather the flange of the hub 12, the screw passing through a corresponding perforation of the said sprocket and thus permitting a slight movement thereon toward and away from the outer face of the roll end. The limit of this movement will, of course, be determined by the position of the head of the screw; and as has been shown in dotted lines, Fig. 2 of the drawings, an appreciable movement axially of such sprocket member is possible. This will serve to accommodate automatically for any reasonable variation in the width of the strip, due, for example, to humidity and temperature changes of the surrounding atmosphere and to which such strip is exposed.

In order further to insure the rigidity and smoothness of action of the movable sprocket member 17 in thus accommodating itself to variations in width of the record sheet, it is preferred to provide the said sprocket with an inwardly directed sleeve portion 23 to which it may be secured as by upsetting the projecting edge of a reduced portion thereof and fitting centrally through said sprocket-wheel 17. The sleeve 23 is designed to fit inwardly within the hub 12, which is suitably recessed for this purpose, said sleeve fitting also over the spindle portion within such hub. By this expedient, a substantial mounting is afforded which will, nevertheless, admit of the free lateral or axial movement of the one drive sprocket to allow for accommodating the aforesaid possible variations in width of the record strip, and no increase in overall length of the main bearing of the roll itself is necessary.

I claim:

1. A drive roll for the charts of strip recording apparatus, comprising a cylindrical roll member, and separated driving sprockets movable therewith, the one sprocket being freely movable axially of said roll to accommodate automatically variations of width in the chart operating over the roll.

2. A drive roll for the charts of strip recording apparatus, comprising a cylindrical roll member, separated driving sprockets movable therewith, the one sprocket being freely movable axially of said roll to accommodate automatically variations of width in the chart operating over the roll, and means to limit the axial movement of said movable sprocket.

3. A drive roll for the charts of strip recording apparatus, comprising a cylindrical roll member, separated driving sprockets movable therewith, the one sprocket being freely movable axially of said roll, and a shouldered screw having an intermediate unthreaded portion passing through the movable sprocket, securing the latter to the roll and limiting the extent of axial movement thereof through engagement of the said sprocket with the head of the screw.

4. A drive roll for the charts of strip recording apparatus, comprising a spindle with hubs secured thereto, a cylindrical roll member mounted upon the hubs, a pair of driving sprockets at the ends of the roll and rotatable therewith, the one sprocket being freely movable axially of said roll, and a sleeve attached to the movable sprocket extending inwardly into a recess of the corresponding hub and about the spindle.

5. A drive roll for the charts of strip recording apparatus, comprising a spindle with hubs secured thereto, a cylindrical roll member mounted upon the hubs, a pair of driving sprockets at the ends of the roll and rotatable therewith, the one sprocket being freely movable axially of said roll, a shouldered screw having an intermediate unthreaded portion passing through the movable sprocket and securing the latter to the corresponding hub to limit the extent of axial movement of the sprocket through engagement of said sprocket with the head of the screw, and a sleeve attached to the movable sprocket extending inwardly into a recess of the corresponding hub and about the spindle.

In testimony whereof I affix my signature.

HERMAN KOESTER.